C. B. WOOD.
Thill-Coupling.
No. 27,086.
Patented Feb. 7, 1860.
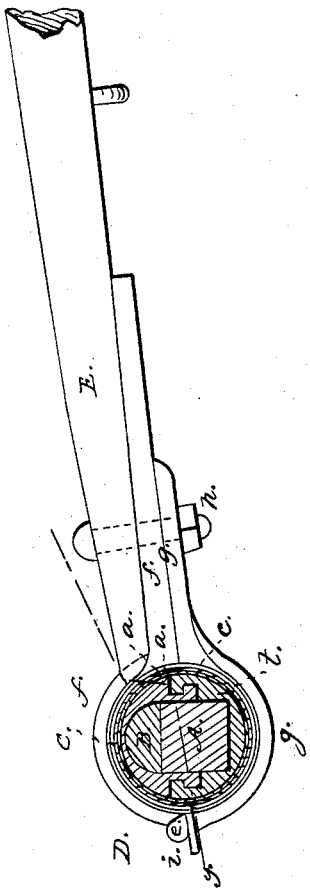
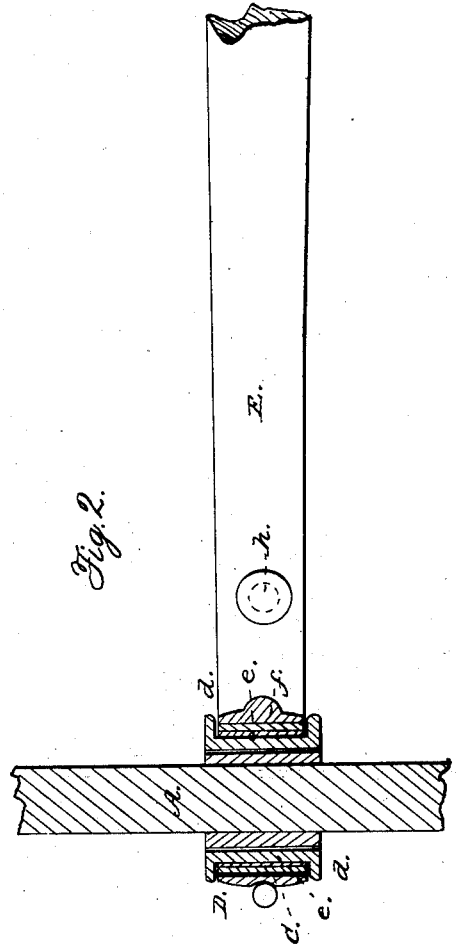
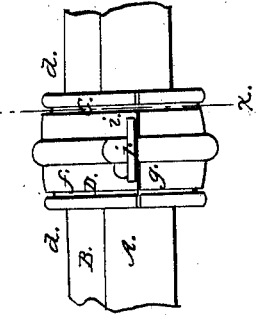
Inventor:

UNITED STATES PATENT OFFICE.

CHARLES B. WOOD, OF NEW YORK, N. Y.

ATTACHING CARRIAGE-THILLS.

Specification of Letters Patent No. 27,086, dated February 7, 1860.

*To all whom it may concern:*

Be it known that I, CHARLES B. WOOD, of the city, county, and State of New York, have invented a new and Improved Mode of Attaching the Thills of Vehicles to Their Axles; and I do hereby declare that the following is a full, clear, and exact description of the same, reference being had to the annexed drawings, making a part of this specification, in which—

Figure 1, is a side sectional view of my invention taken in the line $x$, $x$, Fig. 3. Fig. 2, a plan sectional view of do., taken in the line $y$, $y$, Fig. 1. Fig. 3, a back view of ditto.

Similar letters of reference indicate corresponding parts in the several figures.

This invention consists in having cylindrical clips attached to the front axle of the vehicle and encompassing both the bed and axle; and having eyes attached to the inner ends of the thills which are fitted on the clips and allowed to turn freely thereon; the whole being constructed, arranged, and applied to the vehicle substantially as hereinafter described, whereby a very secure connection of the thills and axle is obtained and one that will not permit of its parts working or wearing loose so as to cause the disagreeable rattle peculiar to the ordinary connections after they become a little worn by use.

To enable those skilled in the art to fully understand and construct my invention I will proceed to describe it.

A, represents a portion of the front axle of a vehicle.

B, is the wooden bed secured to the upper part of the axle.

C, is a clip which is of cylindrical form and composed of two equal longitudinal parts $a$, $b$, connected by a dovetail slide joint $c$, as shown clearly in Fig. 1, said joint being slightly taper so as to cause the clip to bind firmly on the bed and axle as its two parts are driven together. The clip C, has a flanch $d$, at each end of it, said flanches projecting outward at right angles from the periphery of the clip as shown clearly in Figs. 2 and 3. The clip C, may be constructed of cast-metal. Malleable cast iron would answer and be the cheapest material; brass might also be used but it would be considerably more expensive. I do not however confine myself to any particular material in the construction of the clip.

On the clip C, and between the flanches $d$, $d$, leather, India rubber, or other suitable bands $e$, are placed and fitted snugly, and on these bands an eye D, is placed. This eye is attached to the thill E, and it may be formed of two parts $f$, $g$. These parts are of metal, and one part $f$, is attached to the thill F, by screws or bolts and the other part $g$, is attached to the part $f$, by a screw bolt $h$, which passes through the thill and part $f$, and by a key $i$, and loop $j$, at the outer end of the eye, shown more particularly in Fig. 3. The eye D, is secured on the clip by detaching the part $g$, from the part $f$, and then fitting the two parts together on the clip and securing them together by the bolt $h$, and key $i$. The flanches $d$, $d$, keep the bands $e$, as well as the eye D, on the clip, preventing any lateral movement of the eye thereon.

I am aware that cylindrical hubs or projections have been attached to axles to receive the eyes of thills; but, so far as I am aware these hubs or projections have been formed on the axle or permanently connected therewith and therefore did not admit of the bed B, extending the full length of the axle. Such devices also formed an expensive connection and are not in general use. In my invention the clip C, may be applied to any light vehicle. No special construction of the same being required in order to admit of the application of the clip and any repairs that may be necessary can be readily done in fact, a new coupling or connection throughout may be applied to the vehicle at any time with the greatest facility.

It will be understood of course that two clips C, are placed on the axle A, one near each end, in order to form a connection for the two thills.

I do not claim broadly attaching thills to axles by having eyes on the thills encompassing cylindrical hubs or projections on the axle, for that has been previously done; but, I do claim as new and desire to secure by Letters Patent, The clips C, formed of two longitudinal parts a, b, to admit of being securely fitted to the bed B, and axle A, in connection with the eyes D, attached to the thills and arranged so as to encompass the clips substantially as described.

CHAS. B. WOOD.

Witnesses:
M. M. LIVINGSTON,
MICH. HUGHES.